March 14, 1933.  A. JOHNSON  1,901,749
VALVE CONTROLLING MEANS FOR FLUID DISTRIBUTING DEVICES
Filed Aug. 26, 1930
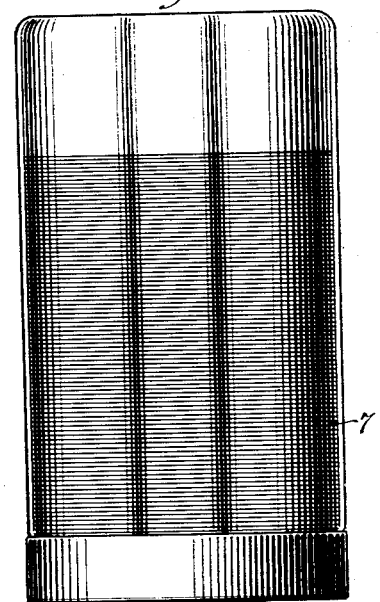
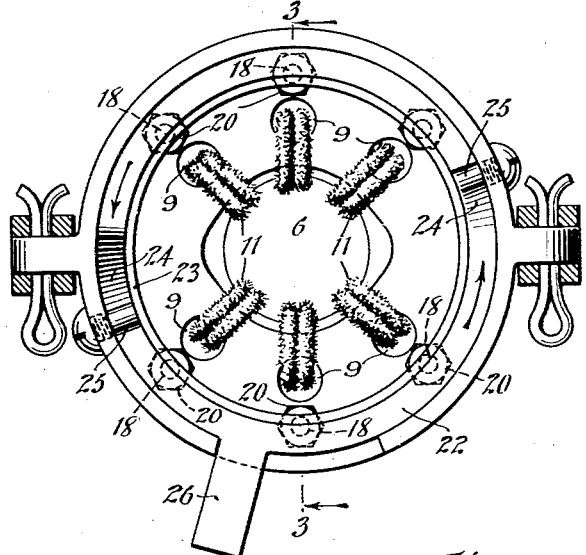
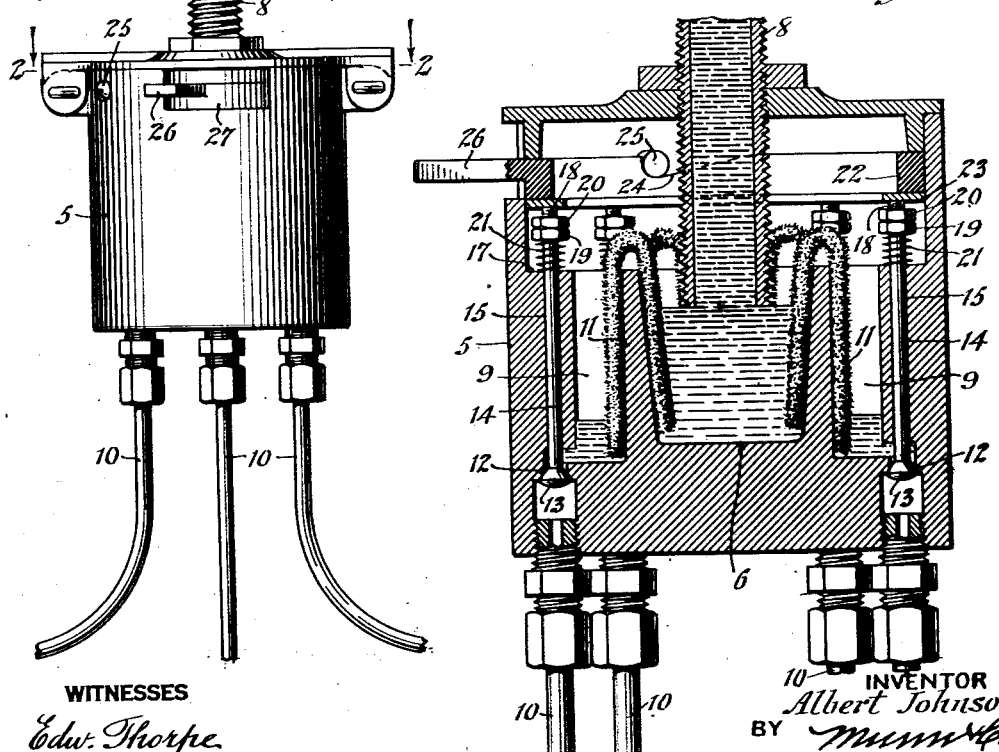
WITNESSES
Edw. Thorpe
Hugh N. Ott
INVENTOR
Albert Johnson
BY Munn & Co
ATTORNEY Patented Mar. 14, 1933

1,901,749

UNITED STATES PATENT OFFICE

ALBERT JOHNSON, OF NEW YORK, N. Y.

VALVE CONTROLLING MEANS FOR FLUID DISTRIBUTING DEVICES

Application filed August 26, 1930. Serial No. 477,889.

This invention relates to a controlling means for fluid distributing devices, and while not necessarily restricted to such use, is particularly designed for lubricators of the type set forth in my prior United States Letters Patent No. 1,770,036, granted July 8, 1930.

The invention broadly aims to provide a mechanism for simultaneously controlling the opening and closing of a plurality of valved outlets leading from a fluid distributing device and by virtue of which the several outlets will be opened and closed in unison.

More specifically, the invention resides in the provision of means of the indicated character, in which a cam operated shiftable element cooperates with a plurality of valves, each of which controls a separate outlet from a reservoir.

Other objects of the invention reside in the comparative simplicity of construction of the valve actuating mechanism, the economy with which it may be produced and the general efficiency derived therefrom.

With the above recited and other objects in view, reference is had to the following description and accompanying drawing, in which there is exhibited one example or embodiment of the invention, while the claim defines the actual scope of the same.

In the drawing:

Figure 1 is a side view of a fluid lubricator equipped with a valve controlling means constructed in accordance with the invention.

Figure 2 is an enlarged horizontal sectional view taken therethrough approximately on the line indicated at 2—2 in Figure 1 of the drawing.

Figure 3 is a fragmentary vertical sectional view taken approximately on the line indicated at 3—3 in Figure 2.

Referring to the drawing by characters of reference, 5 designates a base member which is of substantially cup shaped formation and which defines a well 6 for a fluid lubricant or equivalent substance which is received from a supply in a reservoir 7 through a depending outlet 8 which is adjustable to maintain a predetermined level within the well 6. The base 5 is provided with a plurality of outlet passages 9 with which distributor conduits 10 communicate and each passage 9 receives its supply of fluid from the well 6 through the medium of capillary elements, such as wicks 11, which afford a definite rate of feed of the lubricant or fluid. Each of the outlet passages 9 is provided with a valve seat 12, with which a valve member 13 cooperates to close the outlet passage when the valve member is seated, and to open the same when the valve member is unseated from the seat 12. The valve members 13 are provided with upwardly projecting valve stems 14 which are guided in apertures 15 formed in the base 5, and which protrude above an internal shoulder formed in the said base. The upper ends 18 of the valve stems are threaded to receive an adjustable abutment nut 19 and a binding nut 20. A coiled expansion spring 21 surrounds the protruding portion of each valve stem and is interposed between the shoulder 17 and the abutment nut 19 to normally exert a tension to seat the valve member 13 against its seat 12 for closing the outlet passage 9.

In order to provide means for depressing the valve stems 14 simultaneously, whereby the valves 13 will be unseated in unison to open all of the outlet passages 9, a shiftable element 22 is arranged within the upper portion of the base 5 and bears directly on a thrust member 23 which is superimposed upon the upper ends of the valve stems 14. The shiftable element 22 is provided with a sufficient number of cam surfaces 24 which cooperate with a corresponding number of stationary cam pins 25 carried by the base 5, so that when the element 22 is shifted in one direction, simultaneous depression of the valve stems 14 and consequent unseating of the valve members 13 in unison is accomplished.

In the present instance, it will be observed that the outlet passages 9 are disposed in annular spaced relation around the well 6 and the shiftable element 22 is in the nature of a ring which is turned or moved circumferentially to accomplish its purpose. This arrangement, however, may be varied within the scope of the invention, and it is to be clearly understood that the outlet passages and valves may be in a line, and the shiftable element in the nature of a straight bar. Under the arrangement illustrated, however, the shiftable element is provided with a radially projecting manipulating handle 26 which protrudes through a notched or slotted portion 27 of the base 5.

In operation, when the element 22 is turned or shifted in the direction indicated by the arrows in Figure 2 from the position shown, the cam surfaces 24 cooperate with the cam pins 25 to cause a bodily downward movement of the element 22 and the thrust member 23, thereby depressing the valve stems 14 against the action of the springs 21 to unseat the valve members 13 from their seats 12, thus opening the outlet passages 9 in unison to permit the fluid to flow through the passages 9 into the distributing conduits 10. Conversely, shifting the element 22 in the opposite direction and to the position illustrated in Figures 2 and 3, the springs 21 function to move the valve stems and valves 13 upwardly to seat the latter for closing the outlet passages 9 in unison.

While there has been illustrated and described a single and preferred embodiment of the invention, it is to be clearly understood that no limitation is necessarily intended to the precise structural details, but that variations and modifications which properly fall within the scope of the appended claim may be resorted to when found expedient.

What is claimed is:

In a fluid distributing device, a reservoir having a plurality of outlets arranged in a circle, a valve for each outlet having their stems arranged in a circle with the ends disposed in a common plane, means for normally seating the valves to close the outlets and a common means adapted to act upon said stems for unseating the valves in unison to open the outlets, said means comprising a thrust ring engaging the valve stems, an annular rotatable actuator contacting with the thrust ring and having circumferentially spaced cam portions and stationary devices with which the cam portions engage for imparting movement to the thrust ring.

ALBERT JOHNSON.